(12) United States Patent
Davis et al.

(10) Patent No.: US 7,518,801 B2
(45) Date of Patent: Apr. 14, 2009

(54) METHOD FOR MAKING COLLIMATING OR TRANSFLECTING FILM HAVING A REFLECTIVE LAYER

(75) Inventors: Donald J. Davis, Conneaut Lake, PA (US); Neil D. Lubart, Austin, TX (US); Timothy J. Wojciechowski, Westlake, OH (US); Thomas E. Lash, Shaker Heights, OH (US); Karen Spilizewski, Euclid, OH (US)

(73) Assignee: Brillant Film LLC, Cleveland, OH (US)

( * ) Notice: Subject to any disclaimer, the term of this patent is extended or adjusted under 35 U.S.C. 154(b) by 79 days.

(21) Appl. No.: 11/454,521

(22) Filed: Jun. 16, 2006

(65) Prior Publication Data

US 2006/0291067 A1 Dec. 28, 2006

Related U.S. Application Data

(63) Continuation-in-part of application No. 11/194,360, filed on Aug. 1, 2005, now Pat. No. 7,345,824, which is a continuation-in-part of application No. 10/688,785, filed on Oct. 17, 2003, now Pat. No. 7,428,367, and a continuation-in-part of application No. 10/108,296, filed on Mar. 26, 2002, now abandoned.

(60) Provisional application No. 60/600,272, filed on Aug. 10, 2004.

(51) Int. Cl.
*G02B 27/10* (2006.01)
*G02B 27/30* (2006.01)

(52) U.S. Cl. .................................. 359/620; 359/641

(58) Field of Classification Search ............. 359/619, 359/620, 625, 627, 459, 641
See application file for complete search history.

(56) References Cited

U.S. PATENT DOCUMENTS

| 3,707,416 | A | 12/1972 | Stevens |
| RE27,617 | E | 4/1973 | Olsen |
| 3,919,559 | A | 11/1975 | Stevens |
| 4,542,449 | A | 9/1985 | Whitehead |
| 5,396,350 | A | 3/1995 | Beeson et al. |
| 5,428,468 | A | 6/1995 | Zimmerman et al. |
| 6,010,747 | A | 1/2000 | Beeson et al. |
| 6,011,601 | A | 1/2000 | Kojima |
| 6,473,220 | B1 | 10/2002 | Clikeman et al. |
| 6,759,113 | B1 | 7/2004 | Tang |
| 6,819,465 | B2 | 11/2004 | Clikeman et al. |
| 6,903,788 | B2 | 6/2005 | Shiraogawa et al. |
| 6,919,981 | B2 | 7/2005 | Clikeman et al. |

*Primary Examiner*—Alicia M Harrington
(74) *Attorney, Agent, or Firm*—Pepper Hamilton LLP

(57) ABSTRACT

A method for manufacturing a collimating device is disclosed herein. In one embodiment the method includes a step of constructing a reflective layer. After the reflective layer is constructed, a step of constructing an optical element layer follows, including a step of forming an array of microstructures in the optical element layer. Next, the array of microstructures is abutted against the reflective layer. Heat and pressure are then applied to the optical element layer to puncture the reflective layer and penetrate a predetermined distance through the reflective layer. Sub-assemblies are also defined, wherein optical elements are coupled to prevent light loss.

34 Claims, 14 Drawing Sheets

1600, A, B 1700, 1710, 1720, A, B ns are not to scale and the proportion of certain elements may be exaggerated for the purpose of illustration.

METHOD FOR MAKING COLLIMATING OR TRANSFLECTING FILM HAVING A REFLECTIVE LAYER

CROSS REFERENCE TO RELATED APPLICATION

This application is a continuation-in-part of U.S. application Ser. No. 11/194,360 filed on Aug. 1, 2005, now U.S. Pat. No. 7,345,824, which is a continuation-in-part of U.S. application Ser. No. 10/108,296 filed on Mar. 26, 2002, now abandoned, a continuation-in-part of U.S. application Ser. No. 10/688,785 filed on Oct. 17, 2003, now U.S. Pat. No. 7,428,367, and claims the benefit of priority of U.S. Provisional Application No. 60/600,272 filed on Aug. 10, 2004.

FIELD OF INVENTION

The present application relates to both (1) transflective structures and (2) light collimating structures. In particular, the present application relates to a method of making a reflective layer for transflective films and light collimating films.

BACKGROUND

Light collimating films, sometimes known as light control films, are known in the art. Such films typically have opaque plastic louvers lying between strips of clear plastic. U.S. Pat. No. Re 27,617 teaches a process of making such a louvered light collimating film by skiving a billet of alternating layers of plastic having relatively low and relatively high optical densities. After skiving, the high optical density layers provide light collimating louver elements which, as illustrated in the patent, may extend orthogonally to the surface of the resulting louvered plastic film. U.S. Pat. No. 3,707,416 discloses a process whereby the louver elements may be canted with respect to the surface of the light collimating film. U.S. Pat. No. 3,919,559 teaches a process for attaining a gradual change in the angle of cant of successive louver elements.

Such light collimating films have many uses. U.S. Pat. No. 3,791,722 teaches the use of such films in lenses for goggles to be worn where high levels of illumination or glare are encountered. Such films also may be used to cover a backlit instrument panel, such as the dashboard of a car, to prevent undesired reflections in locations such as the windshield, or a backlit electronic device (e.g., a LCD computer screen or LCD TV).

U.S. Pat. No. 5,204,160 discloses light collimating films that are formed from a plastic film with a series of grooves formed therein. The grooves are filled with a light absorbing material or the sides and bottoms of the grooves may be painted with a light absorbing ink.

U.S. Patent Application Publication No. 2005/0259198 discloses light collimating devices and transflecting devices that include a layer having a plurality of three dimensional optical elements and a reflective layer. The reflective layer has apertures corresponding to the position and shape of the ends of the three dimensional optical elements.

BRIEF DESCRIPTION OF THE DRAWINGS

In the accompanying drawings, structures are illustrated that, together with the detailed description provided below, describe exemplary embodiments of the claimed invention.

In the drawings and description that follows, like elements are identified with the same reference numerals. The draw

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Horizontal plane cross-section" as used herein, refers to a cross-section taken along a plane perpendicular to the direction in which light travels through the element.

"Tapered" as used herein, refers to a narrowing along either a linear or curved line in the vertical plane cross-section direction, such that horizontal plane cross-sections taken at different locations will have different areas. In other words, a tapered object will have a small area end and a large area end.

"Vertical plane cross-section" as used herein, refers to a cross-section taken along a plane parallel to the direction in which light travels through the element.

The present application relates to both (1) transflective devices and (2) light collimating devices. Light collimation is defined as taking the given angular distribution of a light source and increasing the peak intensity, which may be on-axis, by the process of narrowing that given angular distribution.

Light collimating effects can be accomplished by using an optical layer formed by a series of discrete tapered optical elements in combination with a reflecting layer having openings or apertures disposed therein, corresponding to the position and shape of the tapered ends of the optical elements. To perform a light collimating function, the optical element is tapered towards a light source, such that the optical element has a large area end and a small area end. In a light collimating device, the small area ends are light input ends and the large area ends are light output ends.

Transflecting devices and collimating devices are more fully described in U.S. patent application Ser. No. 11/194,360 ("the '360 application"), now published as U.S. Publication No. 2005/0259198 and incorporated herein by reference. The '360 application discloses light collimating devices and transflecting devices that include a layer having a plurality of three dimensional optical elements and a reflective layer. The reflective layer has apertures corresponding to the position and shape of the ends of the three dimensional optical elements. The present application discusses methods for making the three dimensional optical elements and aligning the optical elements with the apertures of the reflective layer.

Figure 1:
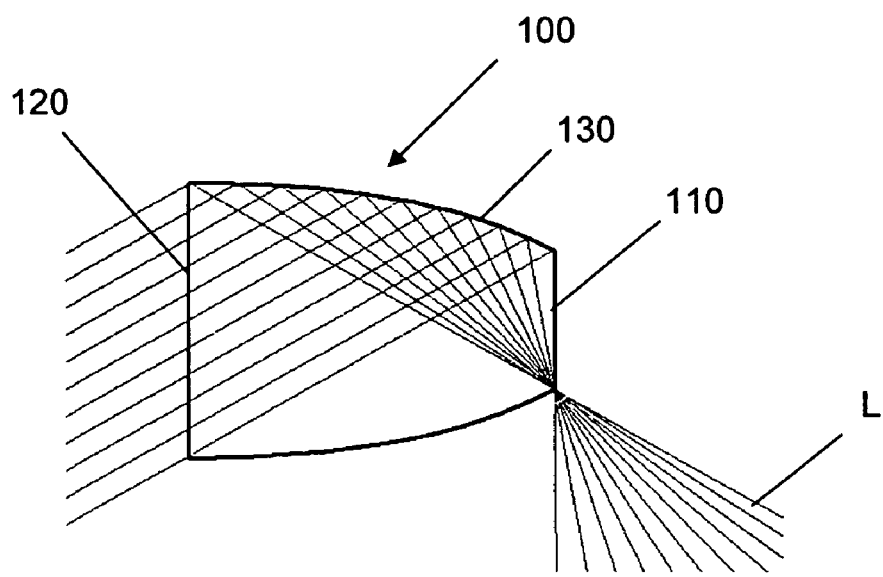
- FIG. 1 is a depiction of a vertical plane cross-section of one embodiment of an optical element.

FIG. 1 illustrates a vertical plane cross-section of one embodiment of an optical element 100. The optical element 100 may be used as part of a light collimating device or as part of transflecting device. The optical element 100 includes a tapered end 110 and a broad end 120. The optical element further includes sidewalls 130 configured to reflect and/or guide light. In the illustrated embodiment, the sidewalls are curved. The curved lines may be parabolic, circular, or defined by other known curves, or a combination thereof. In alternative embodiments, the sidewalls may be defined by straight lines or a plurality of straight and curved lines.

In one embodiment, light L enters the optical element 100 at one end and exits from the opposite end. Some light rays L strike the sidewalls 130 and are reflected. Other light rays (not shown) pass directly through the optical element 100 without striking a sidewall 130.

When the optical element 100 is used as a collimator, light L enters the optical element 100 at the narrow end 110 from multiple directions. As the light L travels through the optical element 100, it may impinge on the sidewall 130. The sidewall 130 reflects the light L and focuses it an angle such that the light L emerges from the broad end 120 as a substantially uniform sheet.

When the optical element 100 is used as a transflector, light from a first source enters the optical element 100 at the broad end 120. As the light travels through the optical element 100, it may impinge on the sidewall 130. The sidewall 130 reflects the light such that it emerges from the tapered end 110. As is described more fully below and in the '360 application, the optical element is used in combination with a reflective layer that reflects light traveling from a second source opposite the first source.

Figure 2:
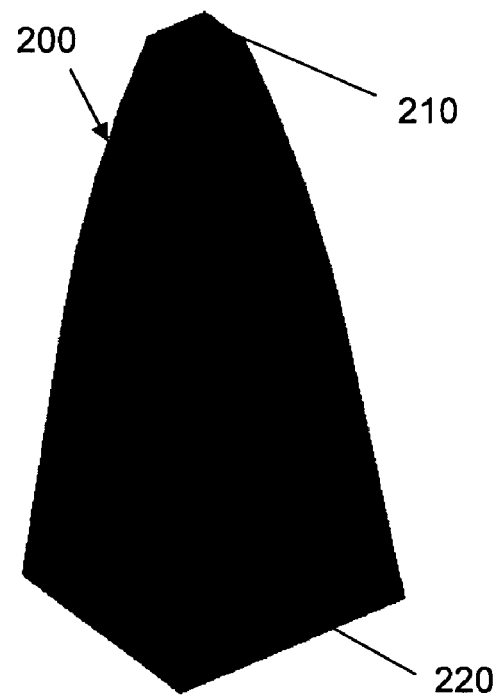
FIG. 2 is a three-dimensional depiction of another embodiment of an optical element.

FIG. 2 illustrates a perspective view of one embodiment of an optical element 200 having a tapered end 210 and a broad end 220. In this embodiment, the optical element is a discrete post and the tapered end 210 is a flat square. The broad end 220 of the optical element 200 is also square and the optical element has a square horizontal plane cross-section. In other embodiments (not shown), the ends and the horizontal plane cross-section may be a circle, a rectangle, or any curved or polygonal shape.

Figure 3:
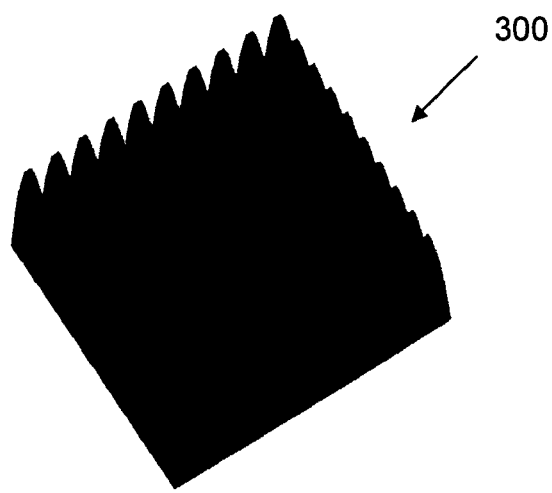
FIG. 3 is a three-dimensional depiction of one embodiment of an array of optical elements defined by cross channels.

FIG. 3 illustrates one embodiment of an optical element array 300 (also referred to as an optical element layer). The illustrated optical element array is an exemplary 10×10 array of optical elements having square horizontal plane cross-sections, such as the optical element 200 illustrated in FIG. 2. In other embodiments, an optical element array can be of any desired size or include any desired number or arrangement of optical elements. As shown, the square cross-section allows for a high packing density of optical elements. As will be explained in more detail below, in one embodiment the optical element array 300 is made by micro-milling a first set of substantially parallel lenticular channels, then micro-milling a second set of substantially parallel lenticular channels that are substantially perpendicular to the first set of lenticular channels.

Figure 4:
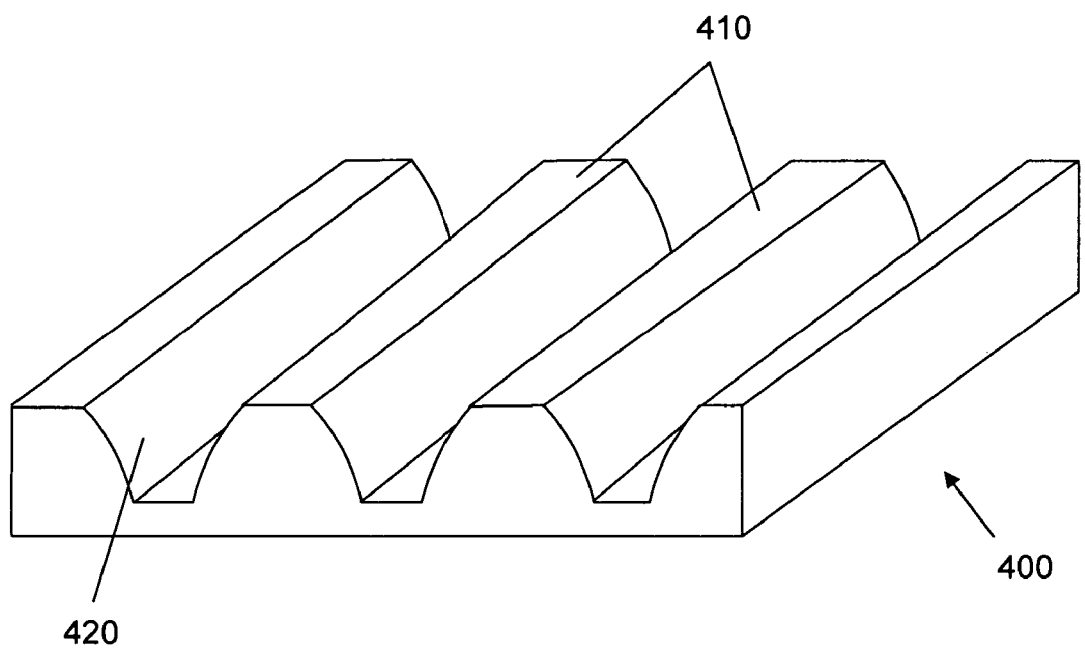
FIG. 4 is a three-dimensional depiction of one embodiment of an array of optical elements defined by lenticular channels.

FIG. 4 illustrates an alternative embodiment of an optical element array 400. In this embodiment, a plurality of optical elements 410 are defined by a plurality of lenticular channels 420. The lenticular channels are substantially parallel to each other. In one embodiment, the lenticular channels 420 are formed by micro-milling.

Figure 5B:
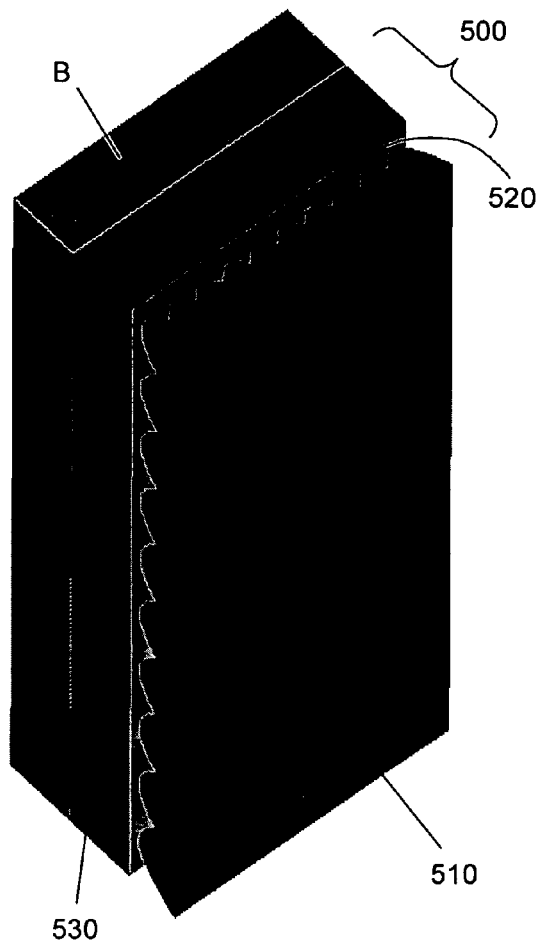
FIGS. 5A and 5B are a perspective view and an exploded perspective view, respectively, of one embodiment of a light collimating device.
Figure 5A:
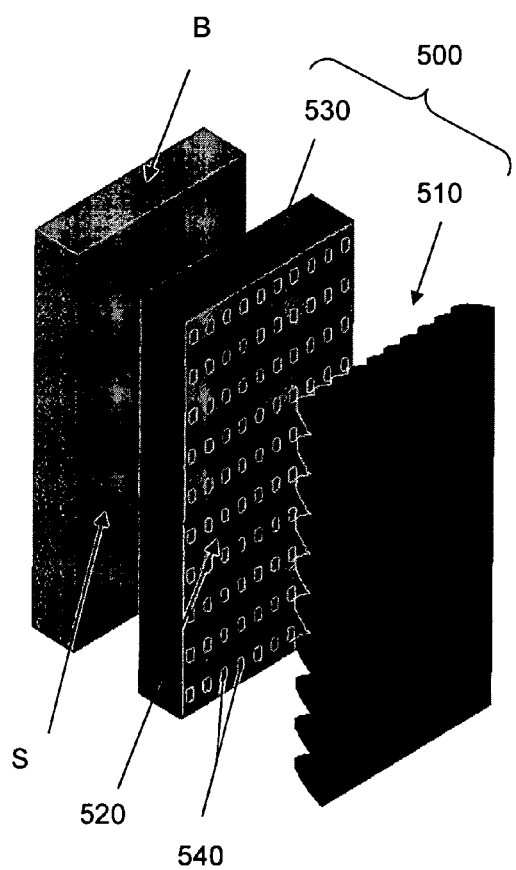

FIGS. 5A and 5B show exploded and assembled views, respectively, of a light collimating device that includes a light manipulating device 500. The light manipulating device 500 includes an optical element layer 510 and a reflecting layer 520. In the illustrated embodiment, the reflecting layer 520 is formed on an immersing layer 530. In the illustrated embodiment, the optical element layer 510 is an array of optical elements formed by cross-channels, such as the optical element array 300 shown in FIG. 3. In an alternative embodiment, the optical elements of the optical element layer are formed by lenticular channels, such as the optical element array 400 shown in FIG. 4.

The reflecting layer 520 includes apertures (or openings) 540 which match the tapered ends of optical elements in the optical element layer 510. In the illustrated embodiment, the apertures 540 are square shaped to correspond with square-shaped tapered ends of the optical elements. In alternative embodiments (not shown), the apertures are polygonal, circular, or any combination of curved and/or straight lines that correspond to the shape of the tapered ends of the optical elements. For example, in the case of optical elements formed by lenticular channels, the apertures of the reflecting layer would be elongated rectangles.

In one embodiment, the reflecting layer 520 is constructed of metal, such as nickel, gold, aluminum, silver, or other suitable metal. In other embodiments (not shown), the reflecting layer may be constructed of any reflecting substance.

Also shown in FIGS. 5A and 5B is a backlight B (such as one used in a LCD TV) having a surface S that simultaneously acts as an emitting and reflecting surface. Those familiar with the state of the art will recognize that this is a standard feature in LCD backlights. The reflecting feature allows for light recycling, a property that enhances performance. In the illustrated embodiment, the tapered ends of the optical elements are facing the backlight B, and thus light manipulating device 500 acts as a light collimator. As will be described further below, if the light manipulating device 500 is reversed, it acts as a transflector.

Figure 6A:
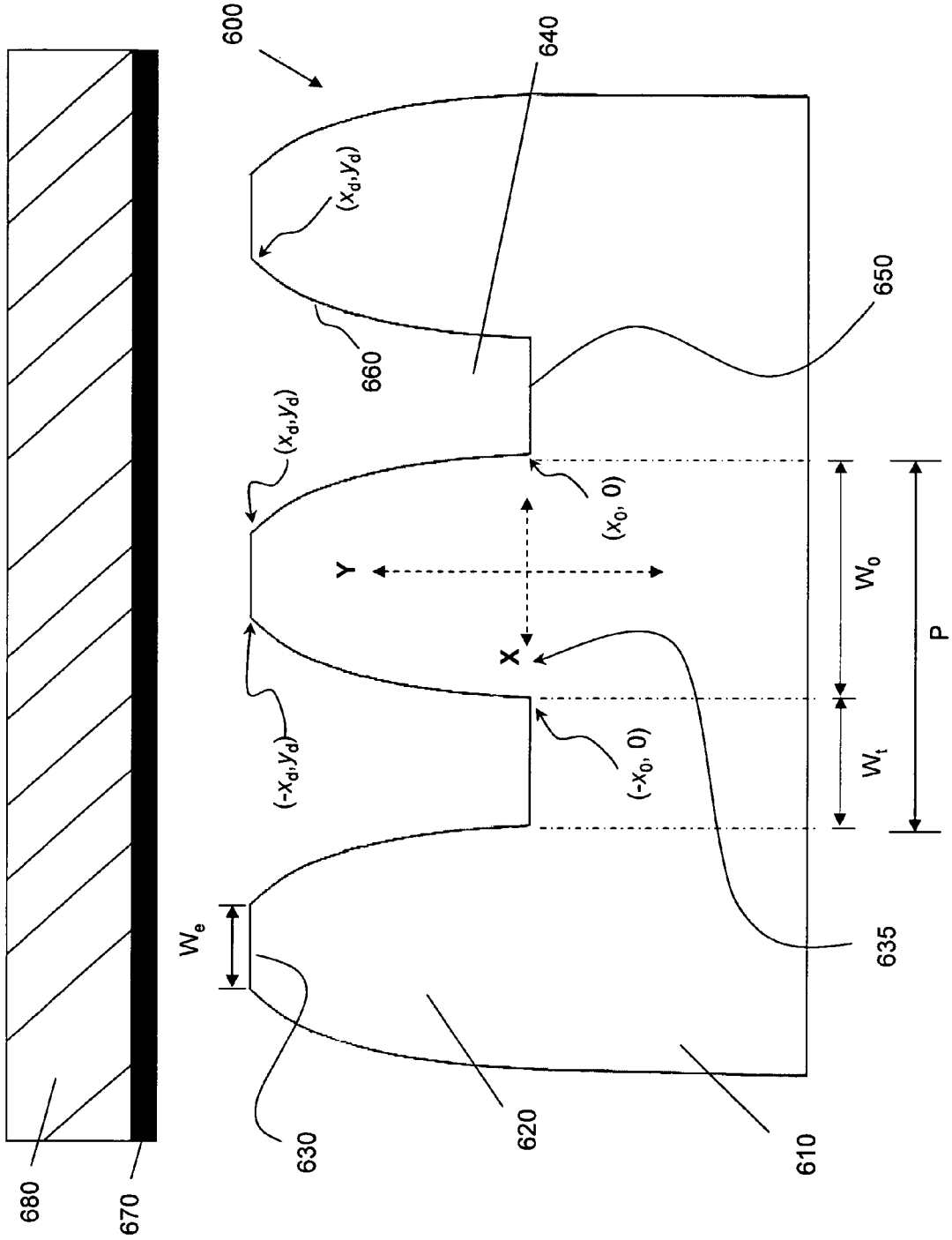
FIGS. 6A and 6B are vertical plane cross-sections of one embodiment of a light manipulating device.

FIG. 6A illustrates a vertical plane cross-sectional view of one embodiment of the light manipulating device 600. In the illustrated embodiment, the light manipulating device 600 includes an optical element layer 610 having a plurality of optical elements 620. Each optical element 620 has a tapered end 630 and a broad end 635. The tapered end 630 has a width $W_e$ and the broad end 635 has a width $W_o$. In one embodiment, the width $W_e$ of the tapered end 630 and/or the width $W_0$ of the broad end 635 are pre-selected. In another embodiment, described in more detail below, other dimensions are pre-selected and the width $W_e$ of the tapered end 630 and/or the width $W_0$ of the broad end 635 are a function of those dimensions. In one embodiment, the width $W_e$ of the tapered end 630 is selected to be 5 μm. In alternative embodiments, the width $W_e$ of the tapered end 630 may be any dimension.

The optical elements 620 are defined by a plurality of channels 640. Each channel has a bottom surface 650 and a pair of sidewalls 660. In one embodiment, the channels 640 are formed by micro-milling. In the illustrated embodiment, the optical elements 620 may be formed by cross-channels, forming an array such as shown in FIG. 3 or the optical elements 620 may be formed by lenticular channels, forming an array such as shown in FIG. 4. In one embodiment, the optical elements are formed by micro-milling a plurality of substantially parallel channels 640 by a tool.

Figure 7:
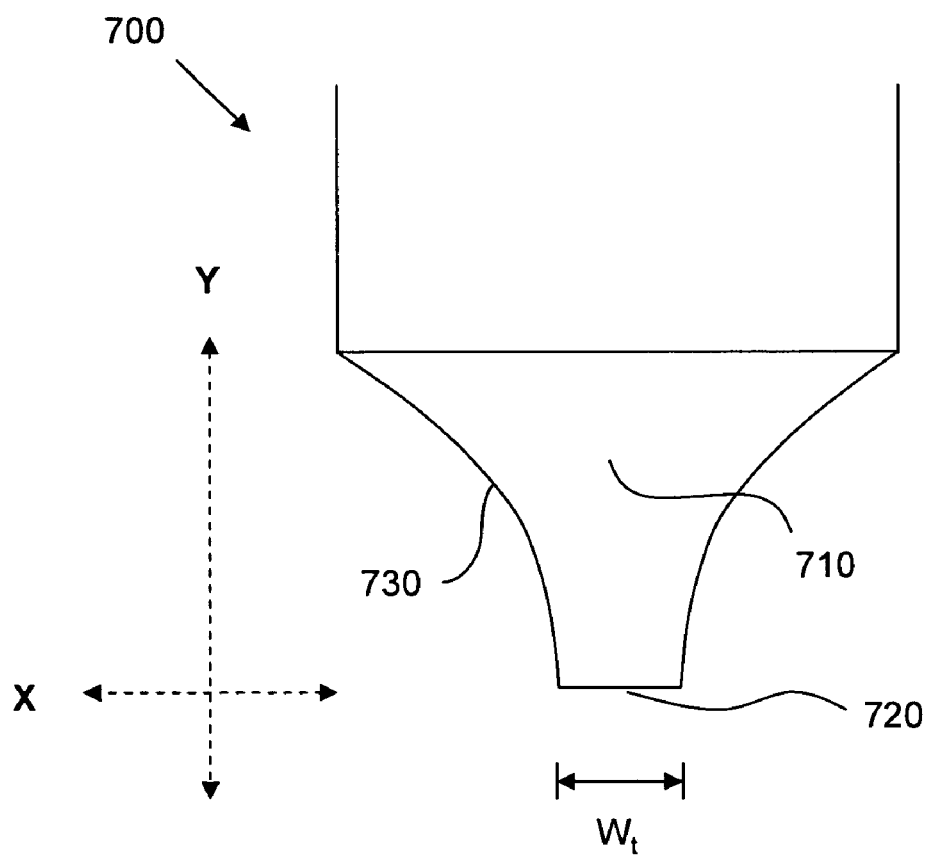
FIG. 7 is a front plan view of one embodiment of a micro-milling tool.

FIG. 7 illustrates a front plan view of one embodiment of a tool 700 for micro-milling channels. In one embodiment, the tool has a bit 710 with a tip 720. In one embodiment, the tool bit 710 is a diamond tool bit. In one embodiment, the tool bit 710 has a width $W_t$ and a sidewall 730 having a shape defined by the equation:

$$(x+k_1)^2+(y+k_2)^2=(k_3)^2 \quad (1)$$

here x is the horizontal distance from a predetermined point external to the bit 710 and y is the vertical distance measured from the tip 720. For exemplary purposes, the X-Y axes defining the curve of the bit 710 are as shown in FIG. 7. In one embodiment, $k_1$=596.2 μm, $k_2$=3.8 μm, and $k_3$=622.26 μm. All dimensions are cited in microns for convenience. In alternative embodiments, other dimensions may be used.

In an alternative embodiment, the above selected k values are scaled proportionally upwards. In one known embodiment, the k values are scaled proportionally upwards by a factor of 5 or less. In another alternative embodiment, the above selected k values are scaled proportionally downwards. In one known embodiment, the k values are scaled proportionally downwards by a factor of 5 or less. In an alternative embodiment, other values may be selected for $k_1$, $k_2$, and $k_3$.

In one embodiment, the bit 710 has a circular horizontal plane cross-section. In this embodiment, the sidewalls 730 of the drill bit are symmetrical about a central radius. In an alternative embodiment, the bit 710 has a polygonal horizontal plane cross-section.

Figure 8:
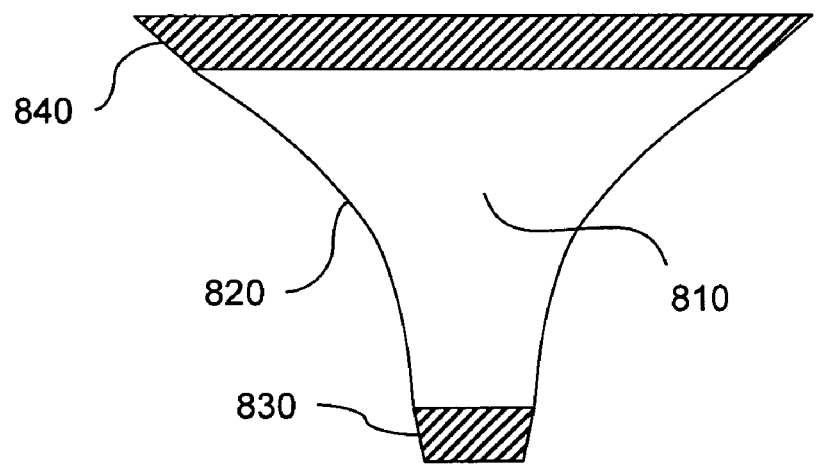
FIG. 8 is a front plan view of an alternative embodiment of a micro-milling tool.

FIG. 8 illustrates an alternative embodiment of a tool bit 810. In the illustrated embodiment, the tool bit 810 has a main body portion 820 having curved sidewalls. In one embodiment, the curved sidewalls are defined by equation (1) above.

In the illustrated embodiment, the tool bit 810 further includes a lower linear end 830 and an upper linear end 840. The lower and upper linear ends 830, 840 each have sidewalls defined by a straight line. Linear ends limit the vertical angle of the sidewall, which has manufacturing benefits. In an alternative embodiment (not shown) the tool bit includes a lower linear end, but not an upper linear end. In another alternative embodiment, the tool bit includes an upper linear end, but not a lower linear end.

In one embodiment, the bit 810 has a circular horizontal plane cross-section. In this embodiment, the sidewalls of the drill bit are symmetrical about a central radius. In an alternative embodiment, the bit 810 has a polygonal horizontal plane cross-section.

Returning to the light manipulating device 600 of FIG. 6A, the channels 640, when milled with the tool 700, will have the same dimensions as the tool 700. In other words, the bottom surface 650 of the channel 640 will have a width equal to the width $W_t$ of the tip 710 and each sidewall 660 will be a curve defined by equation (1) above.

In this embodiment, the origin of the X-Y axes is shown at the center of the broad end 635 of an optical element 620. We may refer to the left and right sidewalls 660 of an optical element 620, rather than refer to the sidewalls of a channel. It should be understood that an optical element may include more than a left and right sidewall. The number of sidewalls of an optical element is determined by the shape of the horizontal plane cross-section of the element.

Under the above stated conventions, we may use a modified equation (1) to define both the left and right sidewalls 660 of an optical element 620. Equation (1) may be modified as such:

$$(|x|+k_1)^2+(y+k_2)^2=(k_3)^2 \quad (2)$$

This modification expresses the symmetry of the optical elements 620 about the Y-axis. As with the tool, in one embodiment, $W_t$=2.5 μm, $k_1$=596.2 μm, $k_2$=3.8 μm, and $k_3$=622.26 μm.

In an alternative embodiment, the above selected k values are scaled proportionally upwards. In one known embodiment, the k values are scaled proportionally upwards by a factor of 5 or less. In another alternative embodiment, the above selected k values are scaled proportionally downwards. In one known embodiment, the k values are scaled proportionally downwards by a factor of 5 or less. In an alternative embodiment, other values may be selected for $k_1$, $k_2$, and $k_3$.

As shown in FIG. 6A, the channel 640 has a depth defined as $y_d$. At the top of the sidewall 660, x has a value defined as $x_d$ (or $-x_d$). The width of the tapered end $W_e$ of the optical element 620 is therefore defined as:

$$W_e=2x_d \quad (3)$$

With continued reference to FIG. 6A, at the bottom of the sidewall 660, y=0 and x has a value defined as $x_0$ (or $-x_0$). The width $W_0$ of the optical element 620 at the broad end 635 is therefore defined as:

$$W_0=2x_0 \quad (4)$$

In one embodiment, the channels 640 are micro-milled such that the optical elements 620 form a regular array having a periodicity P. The periodicity P is defined as the horizontal distance between any point on an optical element, and an identical point on the adjacent optical element. In FIG. 6A, the periodicity P is shown as measured from the right side of the broad end 635 of an optical element 620 to the right side of the broad end of the adjacent optical element. It should be understood that because the optical elements 620 have substantially the same dimensions and are arranged in a regular array, the periodicity P is constant, no matter what point is chosen as a measuring point.

When P is measured from the right side of the broad end 635 of an optical element 620 as described above, it follows that:

$$P=W_t+W_0 \quad (5)$$

Substituting equation (4) into equation (5), it follows that:

$$P=W_t+2x_0 \quad (6)$$

As can be seen from above, the periodicity P, the width $W_t$ of the channel 640 (or the width of the tip 710 of the tool 700), the half-width $x_0$ of the broad end 635 (or the width $W_0$ of the broad end 635), the half-width $x_d$ of the tapered end 630 of the optical element 620 (or the width $W_e$ of the tapered end 630 of the optical element 620), and the depth $y_d$ of the channel 640 are all dependent variables. In one embodiment the width $W_t$ of the channel 640, the half-width $x_0$ of the broad end 635, and the half-width $x_d$ of the tapered end 630 of the optical element 620 are pre-selected. Additionally, in one embodiment, the width $W_t$ of the channel 640 is selected as 2.5 μm, the half-width $x_0$ of the broad end 635 is selected as 26.05 μm, and the half-width $x_d$ of the tapered end 630 of the optical element 620 is selected as 2.5 cm. In this embodiment, from equation (6) it follows that the periodicity P is 54.6 μm. Further, it follows from equation (2), when $k_1$=596.2 μm, $k_2$=3.8 μm, and $k_3$=622.26 μm, then the depth $y_d$ of the channel 640 is 165.8 μm.

In alternative embodiments, other values for the constants and the dependent values may be selected. In another alternative embodiment, the depth of the channels and/or the periodicity may be pre-selected in combination with other dependent variables. In such an embodiment, the remaining dependent variables could be determined based on equations (2)-(6).

After the optical elements 620 are formed in the optical element layer 610 of the light manipulating device 600, a separate reflective layer 670 is formed. In one embodiment, the reflective layer 670 is less than 1 μm. In one known embodiment, the reflective layer 670 is thinner than 0.2 μm, just sufficient thickness and optical density to maximize reflectivity. FIG. 6A shows the reflective layer 670 separate from the optical element layer 610 to show that the reflective layer 670 may be formed separately before it is combined with the optical element layer 610.

In one embodiment, the reflective layer 670 is formed on an immersion layer 680. In one embodiment, the reflective layer 670 is formed directly on the immersion layer 680 by a sputtering process. In alternative embodiment, the reflective layer 670 is formed directly on the immersion layer 680 by a chemical vapor deposition process or any other known forming process. In another alternative embodiment, the reflective layer 670 is a thin, solid layer of reflecting material formed by a rolling process.

In one embodiment, after the reflective layer 670 is formed, it is placed in contact with the tapered ends 630 of the optical elements 620 of the optical element layer 610. Then, a combination of heat and/or pressure of sufficient amounts is used to puncture the optical elements 620 through the reflective layer 670, pushing aside portions of the reflective layer 670 that block or partially block either the sidewall 660 or the tapered end 630 of the optical element layer 610, as shown in FIG. 6B.

In this embodiment, the result is a light manipulating device 600 that (1) reflects light where the reflective layer 670 is intact and (2) transmits light through the optical elements 620 where the optical elements 620 have punctured the reflective layer 670.

Figure 6B:
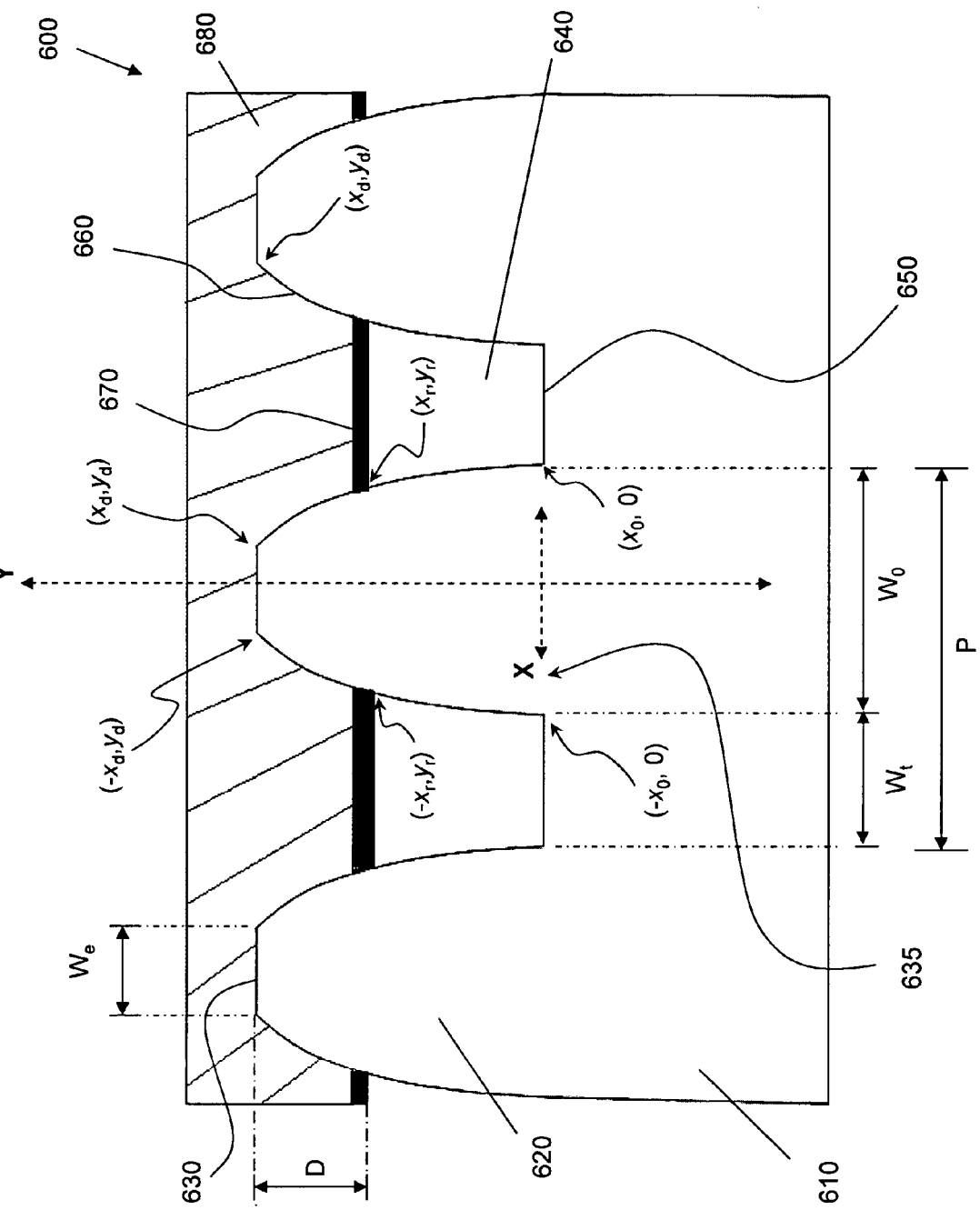

In the embodiment illustrated in FIG. 6B, the reflective layer 670 is disposed on an immersion layer 680. Because the reflective layer 670 is thin, the immersion layer 680 provides stability to and helps maintain the integrity of the reflective layer 670 during the piercing process. The immersion layer 680 is softer than the optical elements 620. In one embodiment, the immersion layer 680 is a polymer film. In one embodiment, the immersion layer 680 is a pressure sensitive adhesive (PSA). In an alternative embodiment, the immersion layer 680 is a polymer with a low glass transition temperature ($T_g$) or a polymer that could be hardened after penetration by exposure to, for example, UV light.

In one embodiment the immersion layer 680 has an index of refraction equal to that of the optical element layer 610. In another embodiment, the immersion layer 680 has an index of refraction lower than that of the optical element layer 610. In yet another embodiment, the immersion layer 680 has an index of refraction higher than that of the optical element layer 610. It should be understood that both the optical element layer 610 and the immersion layer 680 are light transmitting layers.

With continued reference to FIG. 6B, the optical elements 620 puncture the reflective layer 670 and extend through the combined reflective layer 670 and into the immersion layer 680 a specified distance, defined as the penetration depth D. In the illustrated embodiment, the reflective layer 670 is located a vertical distance $y_r$ above the bottom surface 650 of the channel 640. This vertical distance $y_r$ may be any distance less than the depth $y_d$ of the channel 640. Once the vertical distance $y_r$ is selected, a corresponding half-width $x_r$ of the optical element 620 at $y_r$ can be determined from equation (2). In one embodiment, the vertical distance $y_r$ is selected as 150 μm. From equation (2), when $k_1$ =596.2 μm, $k_2$=3.8 μm, and $k_3$=622.26 μm, it follows that the corresponding half-width $x_r$ of the optical element 620 is 6.75 cm.

Additionally, a width $W_a$ of the aperture of the reflective layer 670 can be determined. The width $W_a$ of the aperture is defined as:

$$W_a = 2x_r \quad (7)$$

Therefore, when the half-width $x_r$ of the optical element 620 at $y_r$ is 6.75 μm, it follows that the width $W_a$ of the aperture of the reflective layer 670 is 13.5 μm.

In one embodiment, the combined thickness of the reflective layer 670 and the immersion layer 680 exceeds the penetration depth D of the optical element 620. In an alternative embodiment, the combined thickness of the reflective layer 670 and the immersion layer 680 does not exceed the penetration depth D of the optical elements 620. In other words, in this embodiment, the tapered ends 630 of the optical elements 620 extend beyond the immersion layer 680. The thickness of the immersion layer is limited only by manufacturing constraints of total penetration depth.

Figure 9:
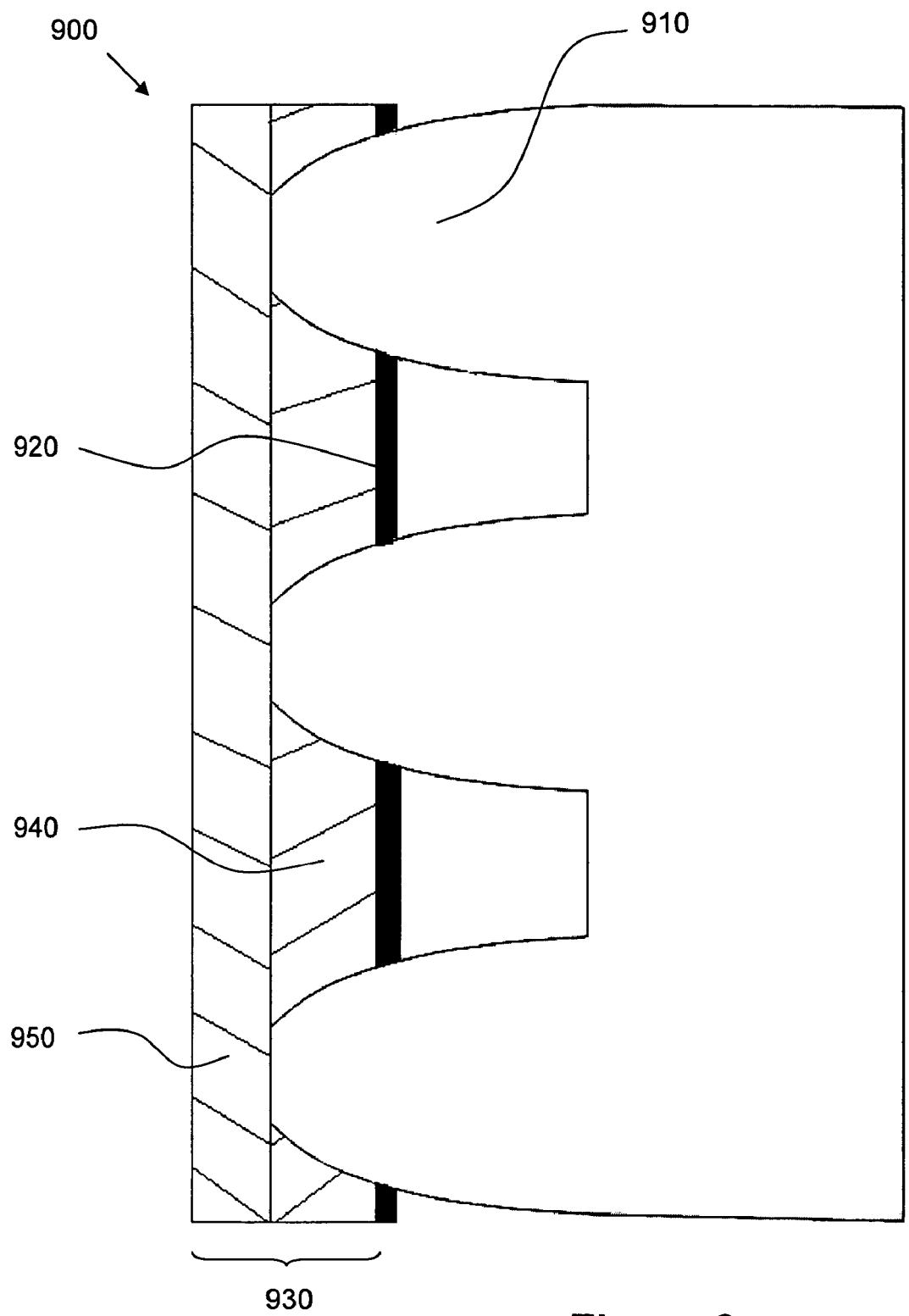
FIG. 9 is a vertical plane cross-section of an alternative embodiment of a light manipulating device having a first and second immersion layer.

FIG. 9 illustrates a vertical plane cross-section of an alternative embodiment of a light manipulating device 900 having an optical element layer 910 and a reflective layer 920. In the illustrated embodiment, an immersion layer 930 includes a first immersion layer 940 disposed on the reflective layer 920 and second immersion layer 950 disposed on the first immersion layer 940, opposite the reflective layer 920. In this embodiment, the first immersion layer 940 is softer than the optical element layer 910, thereby facilitating penetration of the optical element layer 910 into the first immersion layer 940. The second immersion layer 950 is constructed of a material sufficiently hard to stop the penetration. In one embodiment the second immersion layer 950 is as hard as the optical element layer 910. In an alternative embodiment, the second immersion layer 950 is harder than the optical element layer 910. In these embodiments, the thickness of the first immersion layer 940 is equal to the penetration depth of the optical element layer 910.

Figure 10:
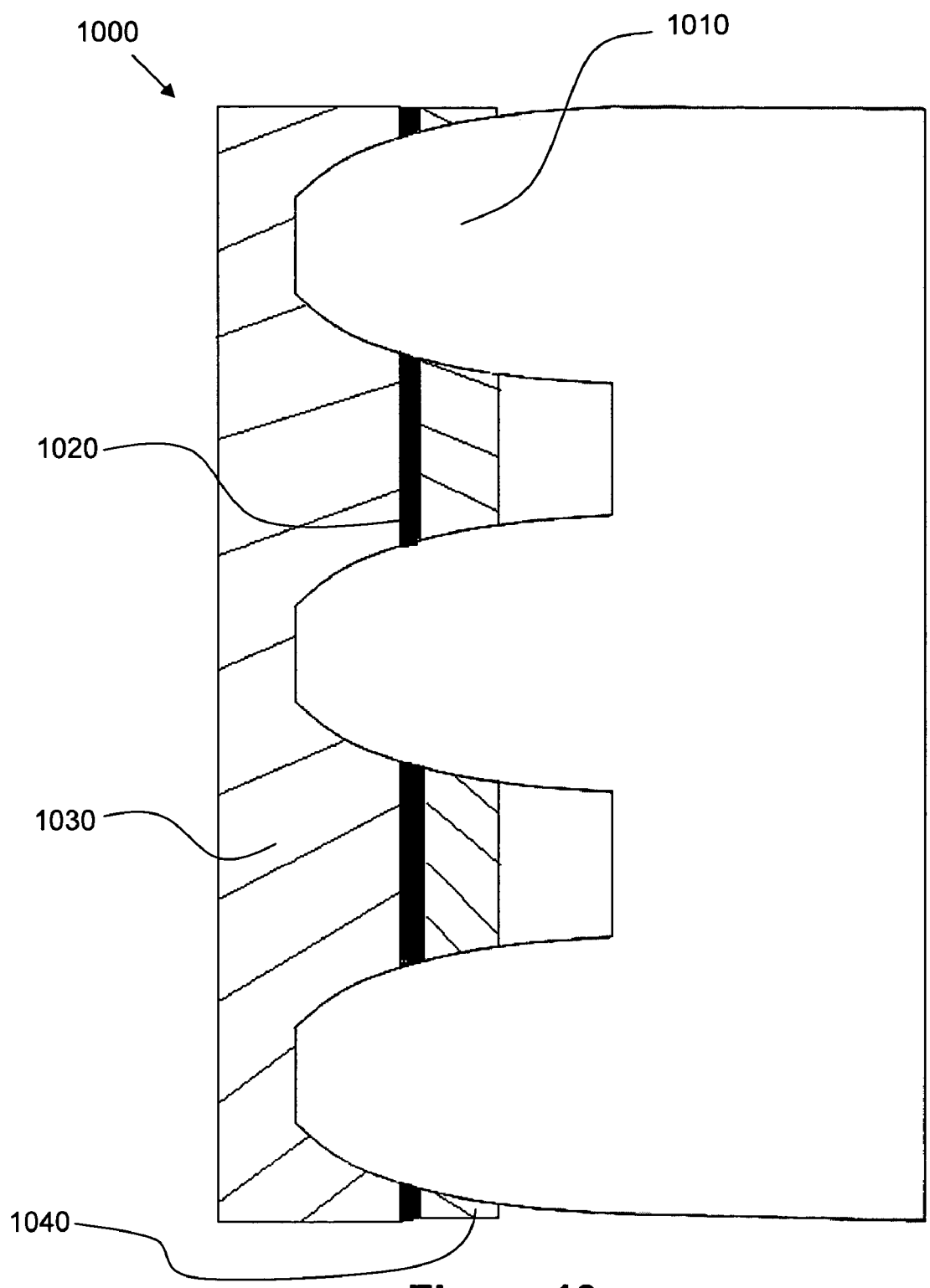
FIG. 10 is a vertical plane cross-section of an alternative embodiment of a light manipulating device having a spacing layer.

FIG. 10 illustrates a vertical plane cross-section of an alternative embodiment of a light manipulating device 1000 having an optical element layer 1010. In the illustrated embodiment, the light manipulating device 1000 includes a reflective layer 1020 and an immersion layer 1030, similar to the reflective layer 670 and immersion layer 680 of the light manipulating device 600 illustrated in FIG. 6. In an alternative embodiment (not shown), the light manipulating device includes a first and second immersion layer, similar to the light manipulating device 900 illustrated in FIG. 9.

With continued reference to FIG. 10, the light manipulating device further includes a spacing layer 1040 disposed on the reflective layer 1020 on the side opposite the immersion layer 1030. The spacing layer 1040 assists in pushing aside the reflective layer to maintain the integrity of the reflective layer 1020 during the piercing process. In one embodiment the spacing layer 1040 is constructed of a polymer. In one specific embodiment, the spacing layer 1040 is constructed of the polymer used to construct the immersion layer 1030.

In one embodiment, the spacing layer 1040 has an index of refraction lower than that of the optical element layer 1010. In one known embodiment, the spacing layer 1040 has an index of refraction sufficiently lower than the optical element layer 1010 such that total internal reflection occurs inside the optical element layer 1010.

In one embodiment, the optical element layer 1010, the immersion layer 1030, and the spacing layer 1040 are all light transmitting layers. In an alternative embodiment, the spacing layer 1040 is not a light transmitting layer.

In one embodiment, the combined thickness of the reflective layer 1020, the immersion layer 1030, and the spacing layer 1040 exceeds the penetration depth D of the optical element layer 1010. In an alternative embodiment, the combined thickness of the reflective layer 1020, the immersion layer 1030, and the spacing layer 1040 does not exceed the penetration depth D of the optical element layer 1010. In other words, in this embodiment, the tapered ends of the optical elements in the optical element layer 1010 extend beyond the immersion layer 1030. In all embodiments, the penetration depth exceeds the combined thickness of the reflective layer 1020 and the spacing layer 1040. If the penetration depth did not exceed this combined thickness, the reflective layer 1020 would not be pierced.

Figure 11:
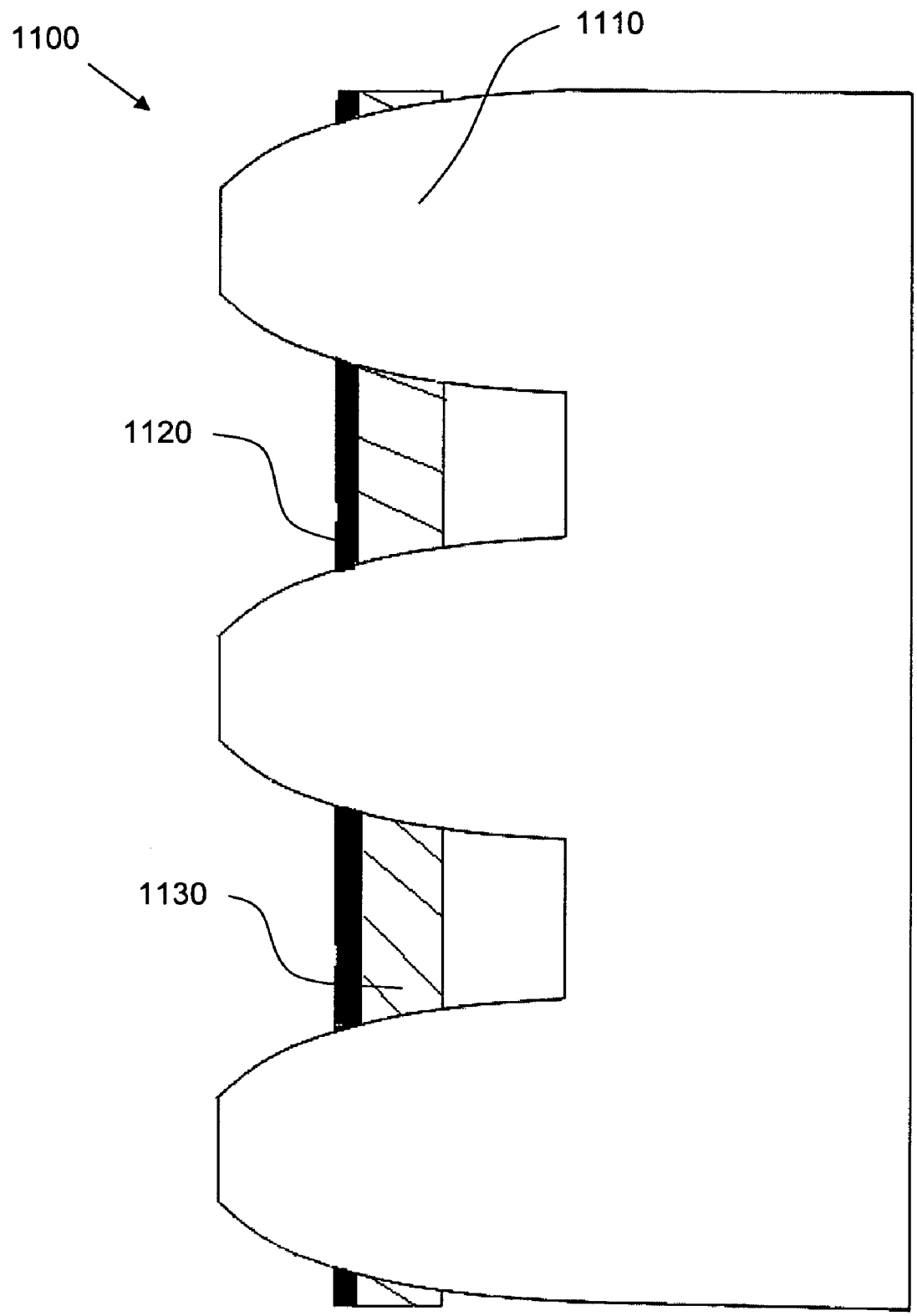
FIG. 11 is a vertical plane cross-section of an alternative embodiment of a light manipulating device with no immersion layer.

FIG. 11 illustrates a vertical plane cross-section of an alternative embodiment of a light manipulating device 1100 having an optical element layer 1110. In the illustrated embodiment, a reflective layer 1120 is disposed on a spacing layer 1130. The optical element layer 1110 then punctures the combined reflective layer 1120 and spacing layer 1130, such as described with relation to FIGS. 6A and 6B.

In one embodiment, the light manipulating device 1100 is employed as illustrated in FIG. 11. In an alternative embodiment, an immersion layer (not shown) is added to the device 1100, such that the device resembles the light manipulating device 1000 illustrated in FIG. 10. The immersion layer may be a liquid polymer that is poured on the device 1100 and then hardens, a semi-solid polymer that is formed around the ends of the optical element layer 1110, or a solid polymer that is preformed to cover both the optical element layer 1110 and the reflective layer 1120.

In one embodiment, the spacing layer 1130 has an index of refraction lower than that of the optical element layer 1110. In one known embodiment, the spacing layer 1130 has an index of refraction sufficiently lower than the optical element layer 1110 such that total internal reflection occurs inside the optical element layer 1110.

In one embodiment, the optical element layer 1110 and the spacing layer 1130 are both light transmitting layers. In an alternative embodiment, the spacing layer 1130 is not a light transmitting layer.

Figure 12A:
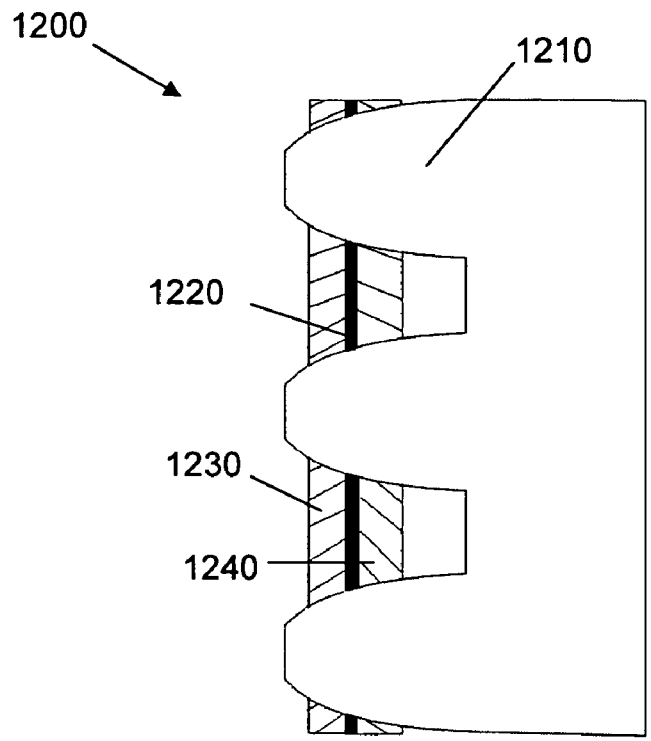
FIGS. 12A and 12B are vertical plane cross-sections of alternative embodiments of a light manipulating device.

FIG. 12A illustrates a vertical plane cross-section of an alternative embodiment of a light manipulating device 1200 having an optical element layer 1210. In the illustrated embodiment, a reflective layer 1220 is disposed between an immersion layer 1230 and a spacing layer 1240. The optical element layer 1210 then punctures the combined reflective layer 1220, immersion layer 1230, and spacing layer 1240, such that the tapered ends of the optical elements extend beyond the immersion layer 1230 and are exposed.

Figure 12B:
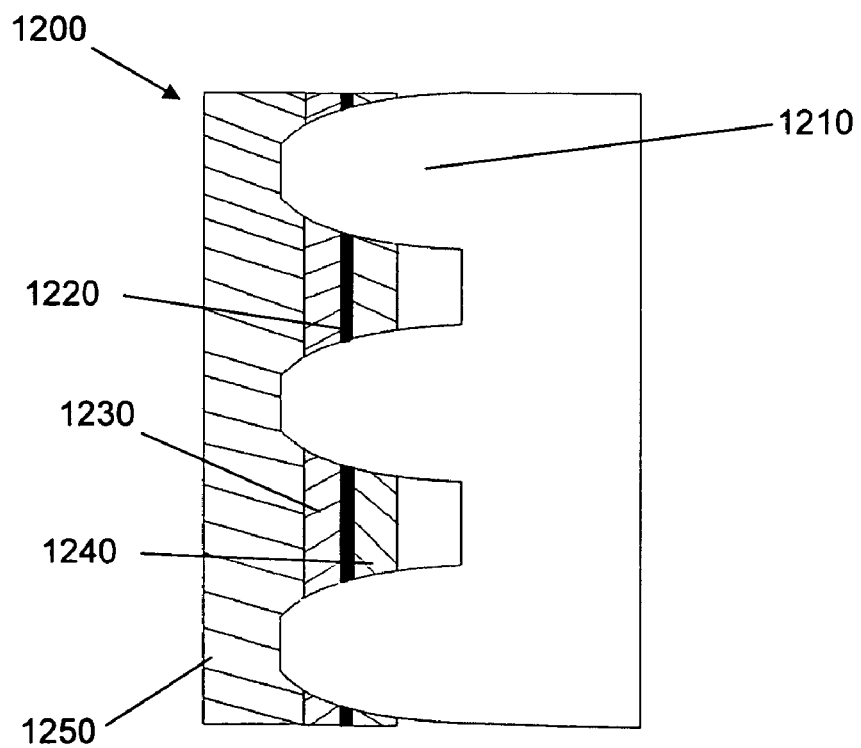

In one embodiment, the light manipulating device 1200 is employed as illustrated in FIG. 12A. In an alternative embodiment, a second immersion layer 1250 is added to the device 1200, such as illustrated in FIG. 12B. The second immersion layer 1250 may be a liquid polymer that is poured on the device 1200 and then hardens, or it may be a solid polymer that is preformed to cover both the optical element layer 1210 and the immersion layer 1230. In one embodiment, the second immersion layer 1250 has the same index of refraction as the immersion layer 1230. In an alternative embodiment, the second immersion layer 1250 has a different index of refraction from the immersion layer 1230.

In one embodiment, the spacing layer 1240 has an index of refraction lower than that of the optical element layer 1210. In one known embodiment, the spacing layer 1240 has an index of refraction sufficiently lower than the optical element layer 1210 such that total internal reflection occurs inside the optical element layer 1210.

In one embodiment, the optical element layer 1210 and the spacing layer 1240 are both light transmitting layers. In an alternative embodiment, the spacing layer 1240 is not a light transmitting layer.

Figure 13:
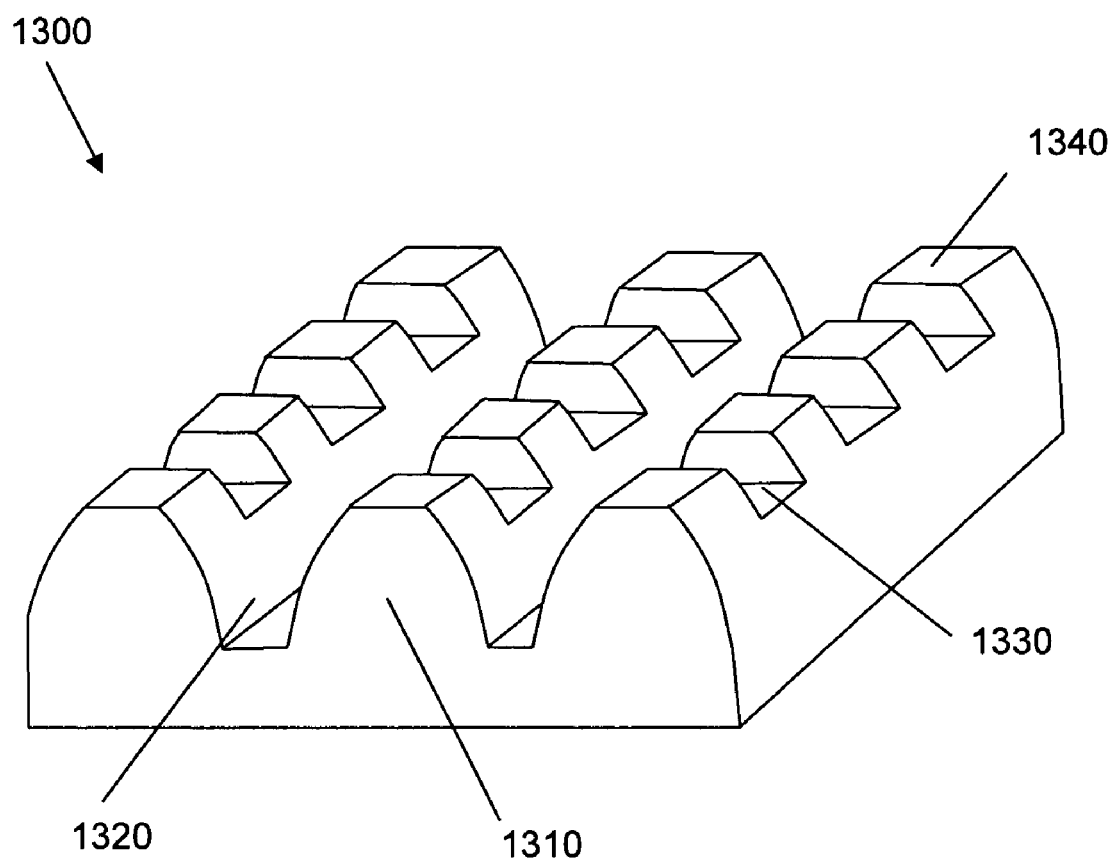
FIG. 13 is a three-dimensional depiction of one embodiment of an array of optical elements defined by lenticular channels and having additional shallow cuts in a top surface.

While the above descriptions applies to both arrays of optical elements formed by cross-channels (such as the array 300 illustrated in FIG. 3) and arrays of optical elements formed by lenticular channels (such as the array 400 illustrated in FIG. 4), in one embodiment, additional steps may be taken with arrays formed by lenticular channels to aid in the piercing of a reflective layer. As is understood in the art, a smaller surface area is more effective at piercing an object. Therefore, FIG. 13 illustrates an array 1300 of optical elements 1310 defined by lenticular channels 1320, wherein the optical elements 1310 further include shallow cross cuts 1330 defining square tops 1340. A common term to describe this shallow cross cut is "nicking". In alternative embodiments, the cross cuts define circular or polygonal tops or any top defined by curved and/or straight lines.

In one embodiment, the periodicity and depth of the cross cuts 1330 are calculated such that the piercing process will not leave unpierced regions in the remainder of the channel while simultaneously totally penetrating the immersion layer and the reflective layer. Unpierced regions are undesirable because they act as dead spots in the collimating device. An appropriate choice of these parameters allows the use of the piercing technique for manufacturing the reflective layer in a lenticular-channeled device.

With continued reference to FIG. 13, the cross cuts 1330 in the optical elements 1310 define a plurality of 5 μm square tops 1340. In order for the cross cut region of the lenticular channels to penetrate the reflective layer, the vertical distance $y_c$ between the base of the cross cut 1330 and the bottom surface of the lenticular channel 1320 must be greater than the vertical distance $y_r$ between the reflective layer (as shown in FIG. 6) and the bottom surface of the lenticular channel 1320:

$$y_c > y_r \quad (8)$$

In one embodiment, the lenticular channel 1320 has a depth $y_d$ of 165.8 μm, the vertical distance $y_r$ between the reflective layer (not shown) and the bottom surface of the lenticular channel 1320 is 150 μm, and the vertical distance $y_c$ between the bottom surface of the cross cut 1330 and the bottom surface of the lenticular channel 1320 is 160.8 μm. Further, instead of defining the vertical distance $y_c$ between the bottom surface of the cross cut 1330 and the bottom surface of the lenticular channel 1320, we may define a nicking depth $D_n$ as the vertical distance from the bottom surface of the cross cut 1330 to the top surface of an optical element 1310. In alternative embodiments, other values of $y_r$ and $y_c$ may be used.

In one embodiment, a cross cut of 1330 having a vertical depth of 160.8 μm relative to the cross channel 1330 is formed by using the tool 700 of FIG. 7 at a depth 5 μm from the tip 720 of the bit 710. In other words, the cross cut 1330 has a nicking depth $D_n$ of 5 μm. To determine the periodicity of the cross cuts 1330, the width of the tool at the nicking depth $D_n$ must be calculated. The width of the tool at a specified distance above the tip 720 can be determined since the change in width is simply twice the difference in the values of x from the tip 720 to the nicking depth $D_n$ of the cross cut 1330. The difference between the two values of x can be calculated by substituting the values of y into equation (2) and subtracting the results. This difference when added to the width of the tool 700 at the tip 710 is equal to the width of the tool at the nicking depth $D_n$. Therefore, when the nicking depth $D_n$ is 5 μm, the two values of x are 26.05 μm and 26.0 μm. Thus the width of the of the cross cut 1330 at the top of the optical element 1320 is 5.1 μm. Accordingly, the cross cuts 1330 have a periodicity 10.1 μm when the depth of cut is 5 μm.

In another embodiment a tool of different shape. For example, the edge of the tool could be chosen to optimize the edge of the penetrator shape that is orthogonal to the channel in the lenticular design.

While the processes described thus far are directed to a method for micro-milling an optical element array, it should be understood that in manufacturing, other methods of making an optical element array may be employed. In one embodiment, the above described process is used to manufacture a master array. The master array is then used to create a negative mold. The negative mold may be used as an impact mold, an injection mold, or a blow mold to form optical element arrays. The master array may be constructed of metal, a hard polymer, or other known material of sufficient hardness to create a negative mold. Similarly, the negative mold may be constructed of metal, a hard polymer, or other known material.

In one embodiment, the negative mold is used to form a second master. The second master is then used to form a second negative mold. The second negative mold may be used as an impact mold, an injection mold, or a blow mold to form optical element arrays. In an alternative embodiment, the process is repeated for several generations and the final negative mold may be used as an impact mold, an injection mold, or a blow mold to form optical element arrays.

In an alternative embodiment, the optical element layer is formed by an electroforming process. In another alternative embodiment, a negative mold is formed by an electroforming process.

FIGS. 14-17 illustrate light manipulating devices, such as those illustrated in FIGS. 6 and 9-13, in use as a collimator or transflector.

Figure 14:
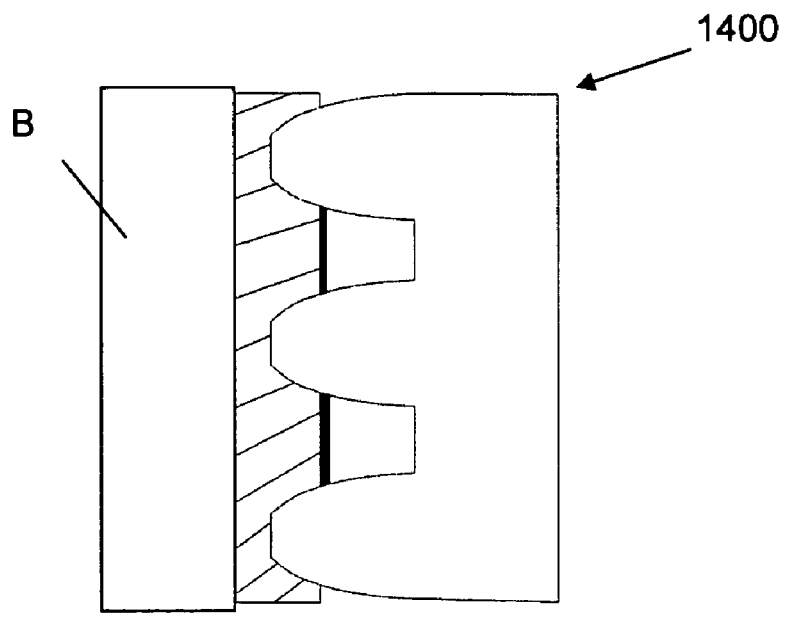
FIG. 14 is a simplified side view of one embodiment of a light collimating assembly.

FIG. 14 illustrates a collimating device 1400 positioned adjacent a backlight B. The collimating device 1400 is one of a light manipulating device 600, 900, 1000, 1100, 1200, or 1300 as shown in FIGS. 6 and 9-13. The collimating device 1400 includes a reflecting layer having apertures formed therein to both transmit light from the backlight B and recycle light back to the backlight B. In this embodiment, the reflecting layer is formed on the side of an immersing layer facing an optical element layer. A more detailed description of collimators is included in the '360 application and is incorporated herein by reference.

In one embodiment, the collimating device 1400 is optically coupled to the backlight B, thereby creating a sub-assembly with no air gaps between the collimating device 1400 and the backlight B. Optically coupling the elements eliminates unwanted loss of light. In an alternative embodiment (not shown), for manufacturing purposes, the collimating device 1400 is positioned adjacent the backlight B such that there is an air gap.

Figure 15:
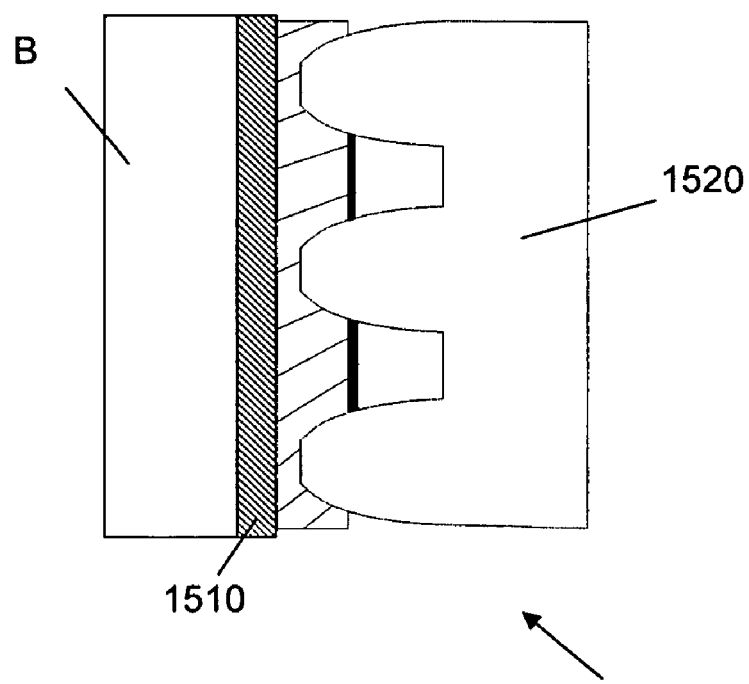
FIG. 15 is a simplified side view of an alternative embodiment of a light collimating assembly.

FIG. 15 illustrates an alternative embodiment of a collimating assembly 1500. In this embodiment, a diffusing layer 1510 is positioned between a collimating device 1520 and a backlight B. In one embodiment, one side the diffusing layer 1510 is optically coupled to the collimating device 1520 and the opposite side of the diffusing layer 1510 is optically coupled to the backlight B, thereby creating an assembly 1600 with no air gaps. In an alternative embodiment (not shown), the diffusing layer 1510 is positioned between the collimating device 1520 and the backlight B such that air gaps exist.

Figure 16:
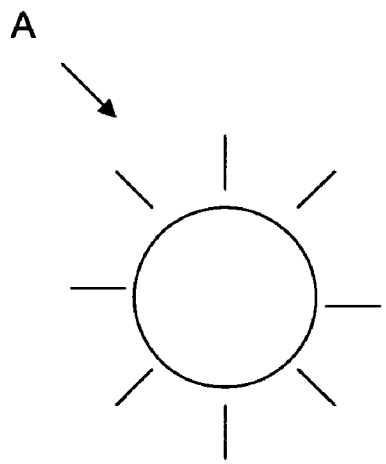
FIG. 16 is a simplified side view of one embodiment of a light transflecting sub-assembly.
Figure 16:
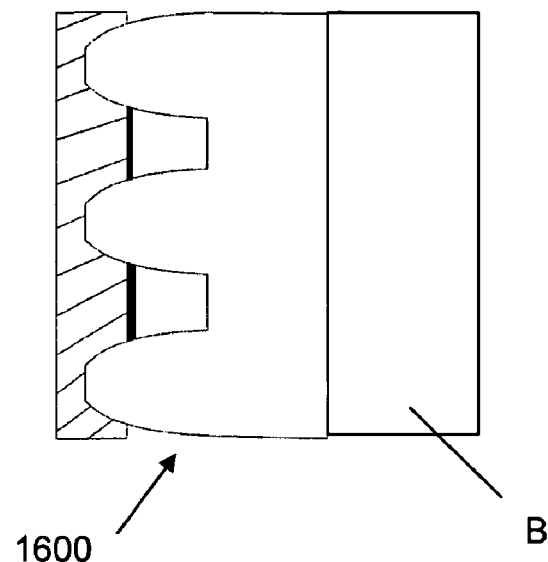

FIG. 16 illustrates a transflective device 1600 positioned between a backlight B and an ambient light source A. The transflective device 1600 is one of a light manipulating device 600, 900, 1000, 1100, 1200, or 1300 as shown in FIGS. 6 and 9-13. The transflective device 1600 includes a reflecting layer having apertures formed therein to transmit light from the backlight B while reflecting light from the ambient light source A. In this embodiment, the reflecting layer is formed on the side of an immersing layer facing an optical element layer. A more detailed description of transflectors is included in the '360 application and is incorporated herein by reference.

In one embodiment, the transflective device 1600 is optically coupled to the backlight B, thereby creating a sub-assembly with no air gaps between the transflective device 1600 and the backlight B. Such an embodiment eliminates unwanted loss of light. In an alternative embodiment (not shown), for manufacturing purposes, the transflective device 1600 is positioned adjacent the backlight B such that there is an air gap.

Figure 17:
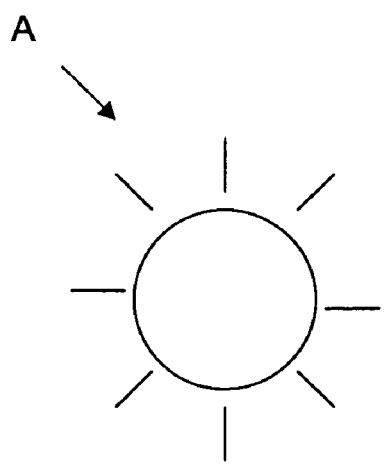
FIG. 17 is a simplified side view of an alternative embodiment of a light transflecting sub-assembly.
Figure 17:
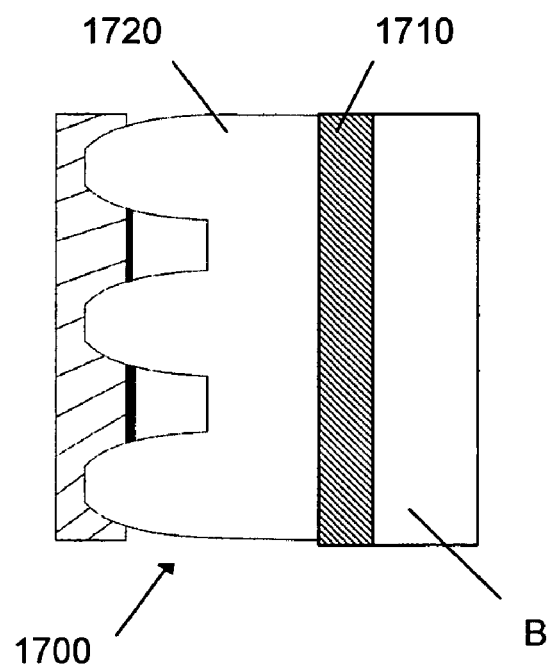

FIG. 17 illustrates an alternative embodiment of a transflective assembly 1700. In this embodiment, a diffusing layer 1710 is positioned between a transflective device 1720 and a backlight B. In one embodiment, one side the diffusing layer 1710 is optically coupled to the transflective device 1720 and the opposite side of the diffusing layer 1710 is optically coupled to the backlight B, thereby creating an assembly 1700 with no air gaps. In an alternative embodiment (not shown), the diffusing layer 1710 is positioned between the transflective device 1720 and the backlight B such that air gaps exist.

Figure 18:
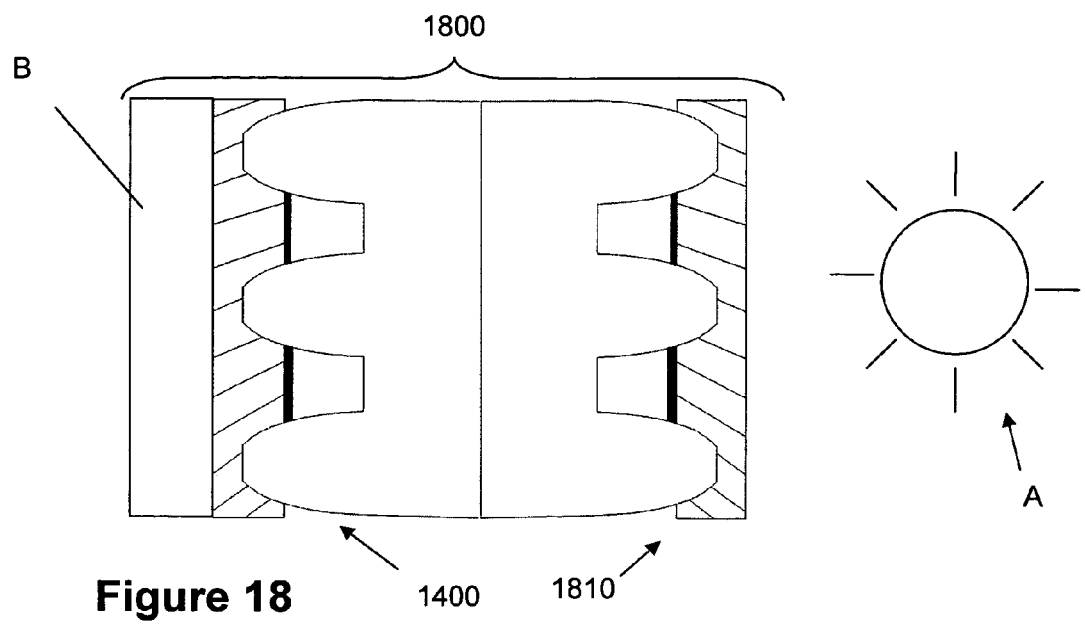
FIG. 18 is a simplified side view of one embodiment of a light transflecting and collimating sub-assembly.
Figure 19:
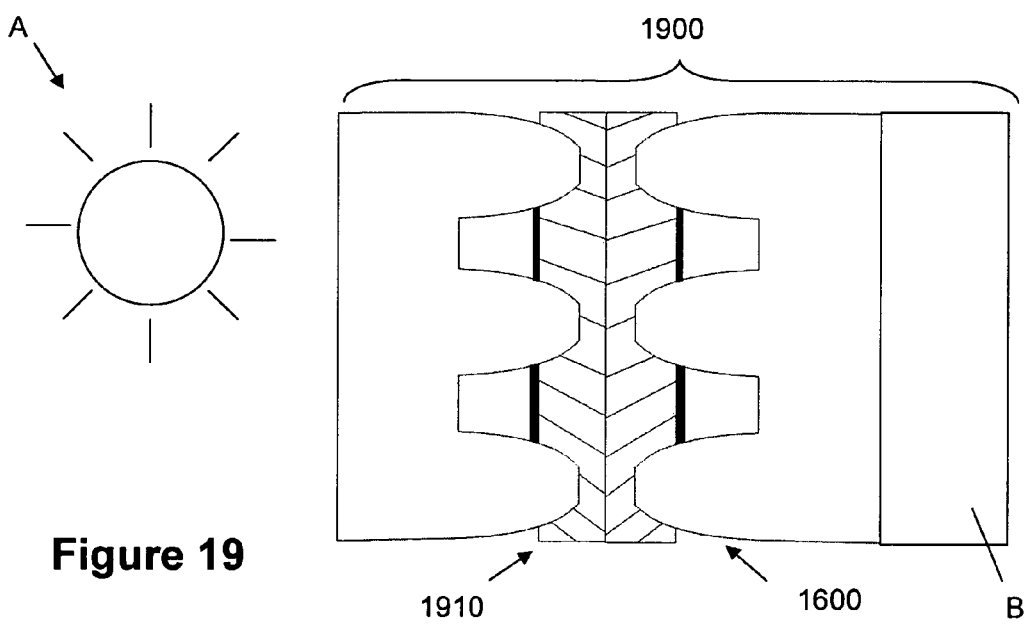
FIG. 19 is a simplified side view of an alternative embodiment of a light transflecting and collimating sub-assembly.

FIGS. 18 and 19 illustrate sub-assemblies that combine both a collimator and a transflective device. FIG. 18 illustrates one embodiment of a sub-assembly 1800 that includes the collimating device 1400 of FIG. 14, adjacent to a backlight B. The collimating device 1400 is also adjacent to a transflective device 1810. The transflective device 1810 is one of a light manipulating device 600, 900, 1000, 1100, 1200, or 1300 as shown in FIGS. 6 and 9-13. In an alternative embodiment (not shown), the sub-assembly includes a collimating device having a diffusing layer, as illustrated in FIG. 15.

In the illustrated embodiment, the sub-assembly components are optically coupled such that there are no air gaps. In an alternative embodiment (not shown), for manufacturing purposes, the collimating device 1400 is positioned adjacent the backlight B such that there is an air gap. In another alternative embodiment (not shown), for manufacturing purposes, the transflective device 1810 is positioned adjacent the collimating device 1400 such that there is an air gap. In yet another alternative embodiment (not shown), for manufacturing purposes, the components are positioned such that there is an air gap between each component of the sub-assembly.

FIG. 19 illustrates one embodiment of a sub-assembly 1900 that includes the transflective device 1600 of FIG. 16, adjacent to a backlight B. The transflective device 1600 is also adjacent to a collimating device 1910. The collimating device 1910 is one of a light manipulating device 600, 900, 1000, 1100, 1200, or 1300 as shown in FIGS. 6 and 9-13. In an alternative embodiment (not shown), the sub-assembly includes a transflective device having a diffusing layer, as illustrated in FIG. 17.

In the illustrated embodiment, the sub-assembly components are optically coupled such that there are no air gaps. In an alternative embodiment (not shown), for manufacturing purposes, the transflective device 1600 is positioned adjacent the backlight B such that there is an air gap. In another alternative embodiment (not shown), for manufacturing purposes, the collimating device 1910 is positioned adjacent the transflective device 1600 such that there is an air gap. In yet another alternative embodiment (not shown), for manufacturing purposes, the components are positioned such that there is an air gap between each component of the sub-assembly.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's claimed invention.

The invention claimed is:

1. A method for manufacturing a collimating device comprising the steps of:
   providing a reflective layer;
   providing an optical element layer;
   forming an array of microstructures in the optical element layer;
   abutting the array of microstructures of the optical element layer against the reflective layer;
   applying heat or pressure to the optical element layer to puncture the reflective layer; and
   penetrating the array of microstructures a predetermined distance through the reflective layer.

2. The method of claim 1, wherein the forming step includes micro machining the optical element layer to form the array of microstructures.

3. The method of claim 1, wherein the forming step includes forming the microstructures with a sidewall profile according to the equation:

$$(X+k_1)^2+(Y+k_2)^2=k_3^2.$$

4. The method of claim 3, wherein the forming step includes forming microstructures with a depth selected to result in a desired aperture in the reflective layer.

5. The method of claim 1, wherein the forming step includes forming microstructures having a flat top surface.

6. The method of claim 1, further comprising steps of:
   providing an immersion layer; and
   applying the immersion layer to the reflective layer.

7. The method of claim 6, wherein the immersion layer is a pressure sensitive adhesive.

8. The method of claim 6, further comprising a step of selecting an immersion layer that is softer than the optical element layer and has an index of refraction less than or equal to that of the optical element layer.

9. The method of claim 6, wherein the immersion layer has an index of refraction lower than that of the optical element layer.

10. The method of claim 6, wherein the immersion layer has an index of refraction greater than or equal to that of the optical element layer.

11. The method of claim 6, wherein:
   the step of providing the immersion layer includes a step of combining at least a first immersion layer and a second immersion layer; and
   the step of applying the immersion layer to the reflective layer includes a step of applying the first immersion layer to the reflective layer.

12. The method of claim 11, wherein the first immersion layer is softer than the optical element layer and has an index of refraction substantially equal to that of the optical element layer.

13. The method of claim 11, wherein the second immersion layer is as hard or harder than the optical element layer and has an index of refraction substantially equal to that of the optical element layer.

14. The method of claim 11, wherein the step of penetrating the array of microstructures a predetermined distance through the reflective layer includes a step of penetrating the array of microstructures through the first immersion layer such that the ends of the microstructures abut the second immersion layer.

15. The method of claim 1, wherein the forming step includes forming cross channels in the optical element layer.

16. The method of claim 1, wherein the forming step includes forming lenticular channels in the optical element layer.

17. The method of claim 16, further comprising a step of making a plurality of shallow cuts in the microstructures.

18. The method of claim 16, wherein the shallow cuts have a depth less than the predetermined distance the array of microstructures penetrate the reflective layer.

19. The method of claim 16, wherein the shallow cuts are formed with a curved profile according to the equation:

$$(X+k_1)^2+(Y+k_2)^2=k_3^2.$$

20. The method of claim 1, further comprising a step of applying a spacing layer to the reflective layer on the same side that abuts the array of array of microstructures of the optical element layer.

21. The method of claim 20, wherein the spacing layer is a pressure sensitive adhesive.

22. The method of claim 20, wherein the spacing layer is softer than the optical element layer and has lower index of refraction than the optical element layer.

23. A method of making a light manipulating device comprising the steps of:
   forming an array of lenticular channels in a light transmitting layer;
   forming an array of shallow cuts orthogonal to the lenticular channels;
   abutting the light transmitting layer against a reflecting layer; and
   piercing the reflecting layer with the light transmitting layer.

24. The method of claim 23, further comprising a step of applying a second light transmitting layer to the reflecting layer.

25. The method of claim 23, further comprising a step of aligning the light transmitting layer with a back light such that light from the backlight is collimated.

26. The method of claim 23, wherein the step of forming lenticular channels includes forming lenticular channels to a first depth, the step of forming shallow cuts includes forming shallow cuts to a second depth less than the first depth, and the step of piercing the reflecting layer includes piercing the reflective layer to a third depth, wherein the third depth is greater than the second depth and less than the first depth.

27. The method of claim 23, further comprising a step of applying a non-light transmitting layer to the reflecting layer.

28. The method of claim 23, further comprising a step of aligning the light transmitting layer with a back light such that light from the backlight is transmitted through the light transmitting layer while light from a second source is reflected by the reflecting layer.

29. A method of making a light manipulating device comprising the steps of:
  forming a first array of channels in a light transmitting layer;
  forming a second array of channels in the light transmitting layer, orthogonal to the first array of channels;
  abutting the light transmitting layer against a reflecting layer; and
  urging portions of the light transmitting layer through the reflecting layer such that light passing through the portions of the light transmitting layer extending beyond the reflecting layer is unimpeded, while light impinging on the reflecting layer is reflected.

30. The method of claim 29, further comprising a step of applying a second light transmitting layer to the reflecting layer.

31. The method of claim 30, further comprising a step of applying a third light transmitting layer to the second light transmitting layer.

32. The method of claim 29, further comprising a step of selecting a location and orientation of the of the first array of channels and selecting a location and orientation of the second array of channels such that a plurality of flat, square surfaces are created.

33. The method of claim 29, wherein the first array of channels and the second array of channels are formed with a curved profile according to the equation:

$$(X+k_1)^2+(Y+k_2)^2=k_3^2.$$

34. The method of claim 29, further comprising a step of applying a non-light transmitting layer to the reflecting layer.

* * * * *